United States Patent [19]

Summers et al.

[11] Patent Number: 4,510,402
[45] Date of Patent: Apr. 9, 1985

[54] OPTICAL HARMONIC GENERATOR

[75] Inventors: Mark A. Summers, Livermore; David Eimerl, Pleasanton; Robert D. Boyd, Livermore, all of Calif.

[73] Assignee: The United States of America as represented by the United States Department of Energy, Washington, D.C.

[21] Appl. No.: 387,060

[22] Filed: Jun. 10, 1982

[51] Int. Cl.³ .............................................. G02F 1/35
[52] U.S. Cl. .................................. 307/427; 372/22; 350/388; 350/392
[58] Field of Search ............. 307/427; 350/392, 393, 350/388, 389; 372/22

[56] References Cited

U.S. PATENT DOCUMENTS 3,387,204  6/1968  Ashkin et al. ................. 350/393 X
3,741,626  6/1973  Wentz ................................ 350/392

OTHER PUBLICATIONS

Craxton, "Theory of High Efficiency . . . Radiation", Optics Communication, vol. 34, No. 3, Sep. 1980, pp. 474–478.
Seka et al., "Demonstration of High Efficency . . . Radiation", Optics Communication, vol. 34, No. 3, Sep. 1980, pp. 469–473.
Summers et al., "A Two Color . . . Lasers", Lawrence Livermore Laboratory Technical Information Sheet, Jan. 12, 1981.
Summers et al., "Nova Frequency Conversion System", Oct., 1981.

Primary Examiner—Jon W. Henry
Assistant Examiner—Lynn Vandenburgh Kent
Attorney, Agent, or Firm—Patrick T. King; Clifton E. Clouse, Jr.; Judson R. Hightower

[57] ABSTRACT

A pair of uniaxial birefringent crystal elements are fixed together to form a serially arranged, integral assembly which, alternatively, provides either a linearly or elliptically polarized second-harmonic output wave or a linearly polarized third-harmonic output wave. The "extraordinary" or "e" directions of the crystal elements are oriented in the integral assembly to be in quadrature (90°). For a second-harmonic generation in the Type-II-Type-II angle tuned case, the input fundamental wave has equal amplitude "o" and "e" components. For a third-harmonic generation, the input fundamental wave has "o" and "e" components whose amplitudes are in a ratio of 2:1 ("o":"e" reference first crystal). In the typical case of a linearly polarized input fundamental wave this can be accomplished by simply rotating the crystal assembly about the input beam direction by 10°. For both second and third harmonic generation input precise phase-matching is achieved by tilting the crystal assembly about its two sensitive axes ("o").

14 Claims, 18 Drawing Figures

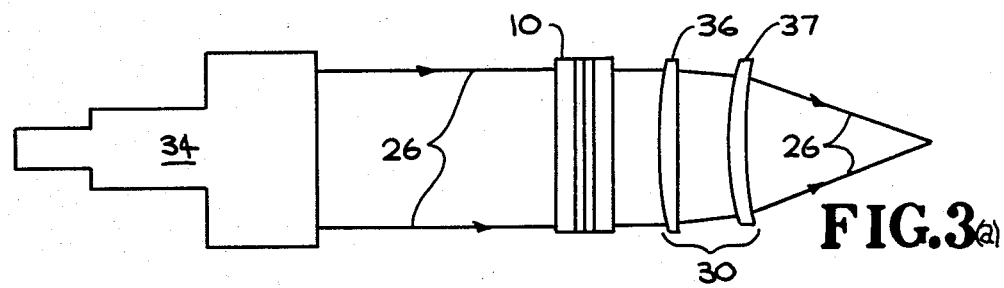
FIG. 3(a)
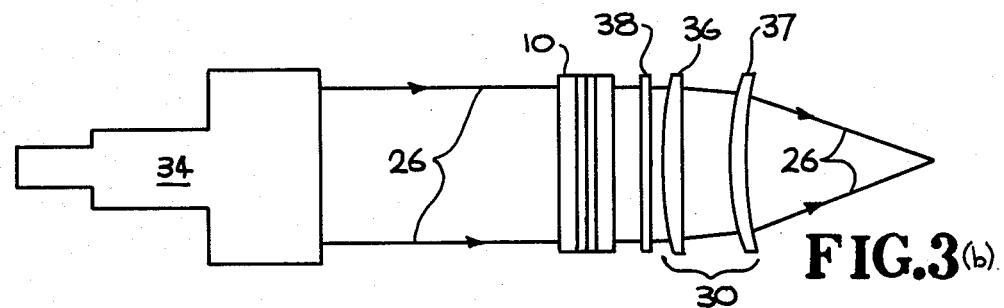
FIG. 3(b)
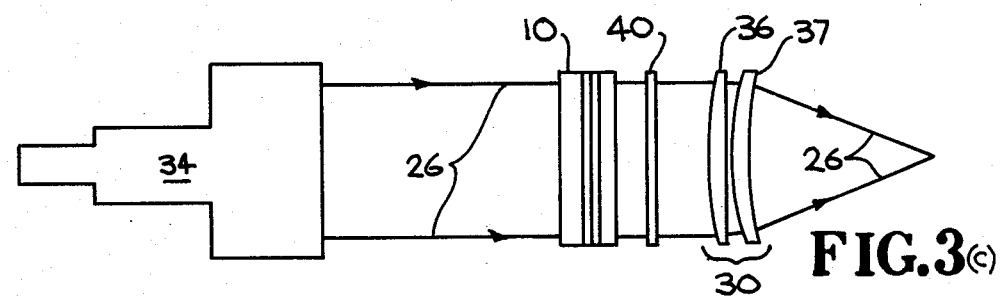
FIG. 3(c)
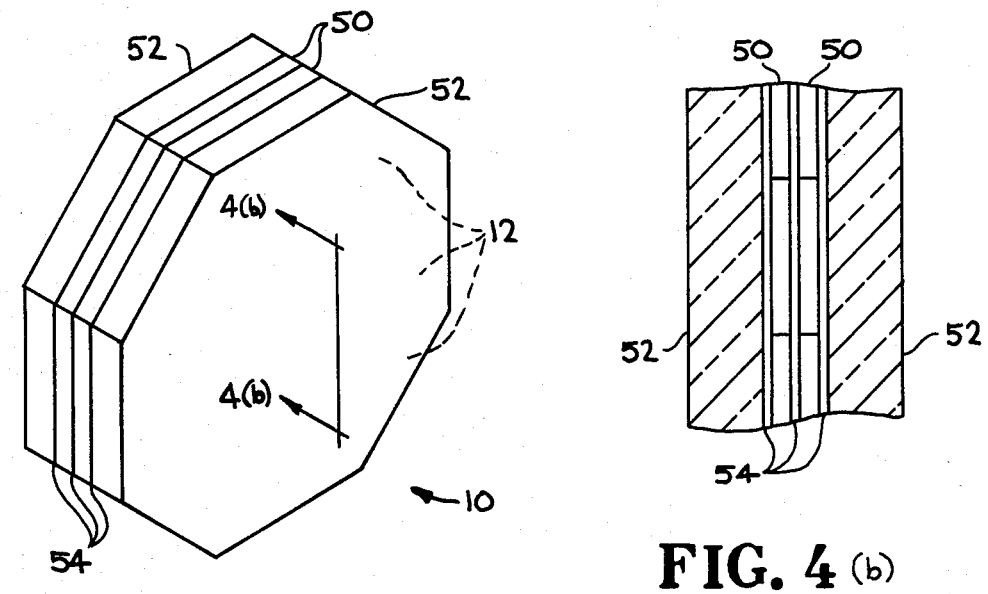
FIG. 4(a)
FIG. 4(b)

OPTICAL HARMONIC GENERATOR

BACKGROUND OF THE INVENTION

1. Field of the Invention

This invention relates to optical frequency harmonic generators using uniaxial birefringent crystals. The U.S. Government has rights in this invention pursuant to Contract No. W-7405-ENG-48 with the U.S. Department of Energy.

2. Prior Art

Harmonic generating using birefringent crystals irradiated with high intensity optical radiation is known. Harmonic-generating apparatus is particularly useful for high-intensity laser systems where intense optical power is easily and relatively efficiently obtainable for certain longer wavelengths but not at shorter wavelengths. For example, Neodimium-glass lasers produce wavelengths in the one micron infrared range. Direct production of green in the one-half micron range of ultraviolet in the one-third micron range is not easily or efficiently accomplished. Therefore, harmonic generators perform an important, useful function. One of the earliest harmonic generation experiments was performed by Franken et al in 1961, shortly after the invention of the laser. See Franken, P. A., Hill, A. E., Peters, C. W., and Weinreich, G., "Generation of Optical Harmonics," Phys. Rev. Lett., 118 (1961). In that experiment, a pulse from a ruby laser at 694.3 nm was focused into a quartz crystal and a very small amount of energy at the second-harmonic frequency 347.15 nm. was obtained.

To be practically useful, much greater conversion efficiencies were required, and a technique called phase-matching was developed to improve conversion efficiency. Phase-matching is required because the fundamental wave travels through the material at a different velocity than does the harmonic wave generated by the fundamental due to normal dispersion. If the proper phase between the fundamental and harmonic waves is not maintained, the second-harmonic waves generated at different points in the material destructively interfere resulting in poor conversion efficiency.

Commonly used for frequency conversion are birefringent crystals, such as KDP, or potassium dihydrogen phosphate. KDP has the characteristic that, for a fundamental input wave which is a linearly polarized ordinary wave, the resulting second harmonic is an extraordinary wave. If the crystal is oriented so that the index of refraction of a fundamental ordinary wave equals, or is matched to, the index of refraction of the second-harmonic extraordinary wave, the various second-harmonic waves produced as the fundamental wave propagates through the crystal will constructively interfere and greatly improve the conversion efficiency of the crystal.

Frequency conversion of the 1.053 micrometer output of high-power Neodymium-glass lasers recently has received much interest at the Lawrence Livermore National Laboratory. Irradiation of laser fusion targets by shorter wavelengths provides significant advantages. Production of third-harmonic waves at 0.35 micrometers from 1.053 micrometer, high-intensity waves were reported by Seka et al in "Demonstration of High Efficiency Third Harmonic Conversion of High Power Nd-Glass Laser Radiation," Optics Communications, Vol. 34, No. 3, p, 469 (1980). The apparatus incorporated spatially separated Type II KDP crystals. The first crystal was angle tuned for second harmonic generation but the input polarization was set at thirty-five degrees with respect to the ordinary direction of the first crystal so that second-harmonic generation efficiency of 67 percent was obtained in the first crystal. The remaining thirty-three percent of the fundamental wave was then mixed in the second space-apart crystal to generate the third-harmonic wave.

Prior frequency-doubling systems required the use of different components when, for example, third-harmonic operation was desired. Many of the components, such as the frequency doubling crystals element are expensive and were not useful for conversion to other harmonics. Even for fundamental operation, it was required that the frequency-converting apparatus be removed from the optical path. Obviously, having separate sets of apparatus unique from the optical path to operation at only one particlar harmonic wavelength which requires elaborate setup procedures in expensive, time-consuming, and very inflexible.

The Nova Laser Fusion Project at the Lawrence Livermore National Laboratory requires large-aperture, high-fluence lasers beams at the second and third harmonics of the 1.053 micrometer wavelength N-d glass lasers. The aperture diameter presently contemplated is 74 cm, which requires very large and expensive optical components. To minimize cost, it is desireable that the frequency converting apparatus for this program not use three different KDP crystal assemblies, that is, one for frequency doubling alone, one for a frequency-doubler to drive a third-harmonic generator, and one for use as a third-harmonic mixer.

SUMMARY OF THE INVENTION

It is therefore an object of this invention to provide frequency-conversion apparatus for high-power laser systems which reduces costs by utilizing common and interchangeable components.

It is another object of the invention to provide frequency-conversion apparatus for high-power laser systems which has high optical conversion efficiency over a wide range of beam intensities.

It is another object of the invention to provide frequency-conversion apparatus for high-power laser systems which permits relatively easy conversion from operation at one harmonic to another with a minimum of adjustments.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with these and other objects of the invention, apparatus and a method for optical frequency generation are provided which satisfy the above objects and provide significant economic and operational advantages when second and third-harmonic conversion is required in high-power laser systems.

According to one aspect of the invention, an optical frequency generator is disclosed which provides a second-harmonic output wave when irradiated by a sufficiently intense fundamental having a propagation vector K and an linearly or elliptically polarized electric-field. First and second crystal elements are fixed in position with respect to one another in an integral assembly such that the extraordinary "e" axes of each are in quadrature. The electric-field polarization vector of the input wave is aligned with the crystal elements at a forty-five degree angle with respect to each ordinary ("o") axis so that the "o"-direction and "e"-direction components are substantially equal. The propagation vector k of the input wave is aligned at the phase matching angles with respect to the optic axes of each crystal element to produce quadrature second-harmonic output waves from the assembly.

For third-harmonic operation, according to another aspect of the invention, the above assembly is adjustably mounted so that the input polarization vector provides twice as much intensity in the ordinary direction of the first crystal element as is provided in the extraordinary direction, corresponding to an angle between the input polarization vector and the ordinary direction of the first crystal of $\tan^{-1} 1/\sqrt{2}$, or about thirty-five degrees. The propagation vector of the input wave is adjusted with respect to the optic axis of the second crystal element so that second-harmonic waves from the first crystal element mix in the second crystal with fundamental input waves to produce third-harmonic output waves.

Type II KDP crystals are preferred crystal elements for operation of the invention with input waves of 1.053 micrometers and output waves of 0.527 and 0.351 micrometers.

It should be appreciated that both the first and the second crystal elements may be identical and therefore readily interchangeable and commonly manufactured and specified for either element in the integral assembly. It should also be appreciated that for Type II KDP crystals elements at the frequencies referred to hereinabove and linearly polarized input fundamental, that to convert from one output frequency to another, the assembly is merely rotated approximately ten degrees and the phase-matching angle of the second crystal element is adjusted or tilted about 4.4 milliradians.

BRIEF DESCRIPTION OF THE DRAWINGS

The accompanying drawings, which are incorporated in and form a part of the specification, illustrate the invention and, together with the description, serve to explain the principles of the invention. In the drawings:

FIG. 3(a) is a schematic representation of the invention in the Nova frequency conversion system with the frequency converter assembly detuned for fundamental frequency irradiation of a laser fusion target;

FIG. 3(b) is a schematic representation of the invention in the Nova frequency conversion system with the frequency converter assembly tuned for second-harmonic frequency irradiation of a laser fusion target;

FIG. 3(c) is a schematic representation of the invention in the Nova frequency conversion system with the frequency converter assembly tuned for third-harmonic frequency irradiation of a laser fusion target;

FIG. 4(a) is an isometric schematic view of an integral assembly of two KDP crystal elements formed from arrays of KDP crystals;

FIG. 4(b) is a detailed view taken along sectional line 4a—4a of a portion of the integral assembly shown in FIG. 4(a);

DETAILED DESCRIPTION OF THE PREFERRED EMBODIMENTS

Reference is now made in detail to the present preferred embodiments of the invention which illustrate the best mode presently contemplated by the inventors of practicing the method and apparatus of the invention, preferred embodiments of which are illustrated in the accompanying drawings.

Figure 1:
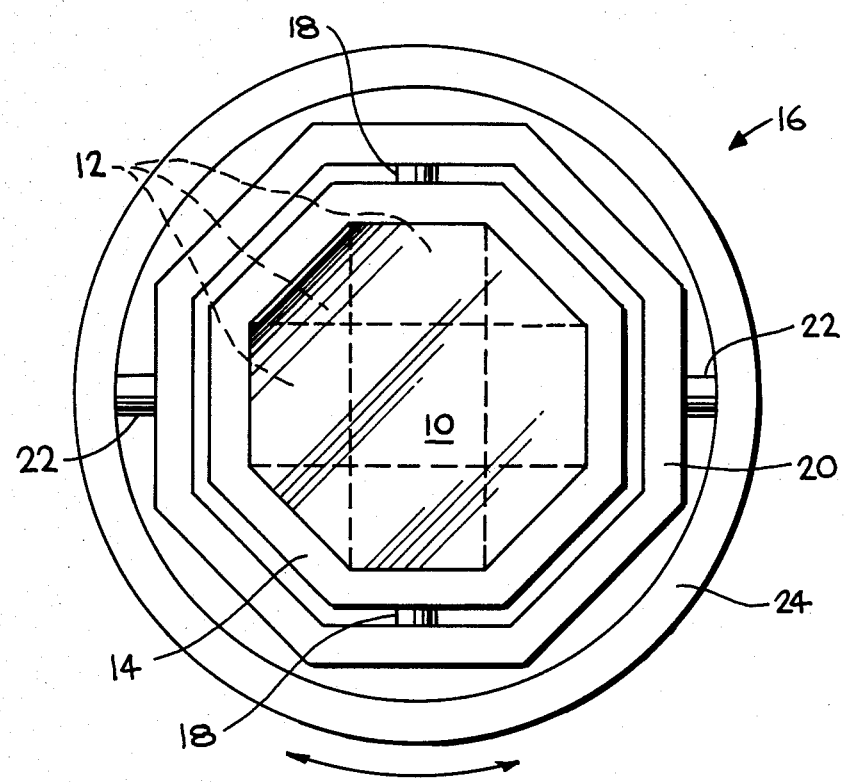
FIG. 1 is a pictorial representation of an optical frequency generator according to the invention mounted on a representative rotatable gimbal assembly.

Referring to the drawings, FIG. 1 pictorially shows an integral assembly 10 of KDP crystal elements 12 formed into an array and mounted on an inner frame 14 of a rotatable, gimballed alignment structure 16. For the Nova laser-fusion project at the Lawrence Livermore National Laboratory the clear aperture diameter of the array is 74 cm. The inner frame 14 is mounted on pivots 18 which permit the integral assembly 10 to be tilted about an axis extending through a vertical plane. The pivots 18 extend between the inner frame 14 and an outer frame 20. The outer frame is mounted on pivots 22 which permit the integral assembly 10 to be tilted about an axis extending through a horizontal plane. The pivots 22 extend from the outer frame 20 to a rotatable mounting ring 24 which is rotated to align the gimballed structure 16 with the optimum electric-field polarization of an input wave.

Figure 2:
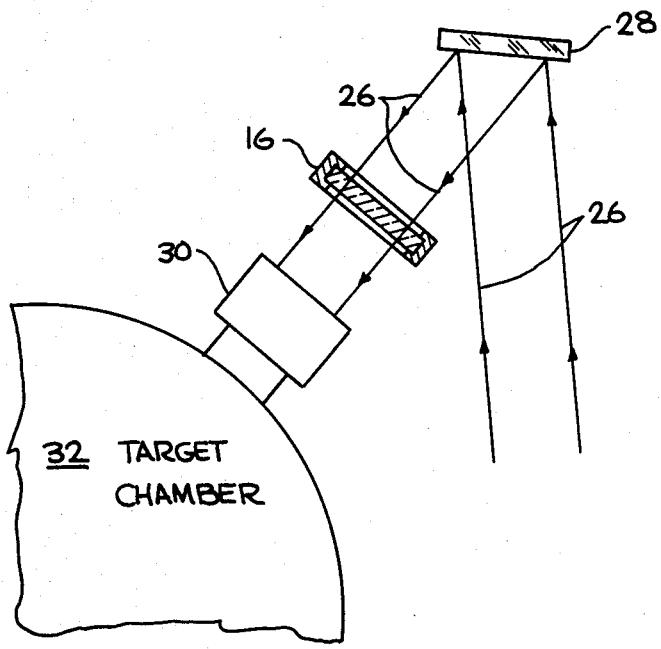
FIG. 2 is a view showing a frequency generator assembly in relative location to a laser-fusion target chamber and a turning mirror.

FIG. 2 schematically shows the rotatable, gimballed alignment structure 16 receiving intense radiation, with the outer boundaries thereof represented by the rays 26, from the final turning mirror 28 of a Nd-glass laser chain operating at, for example, a wavelength of 1.053 micrometers. The function of the integral assembly 10 of KDP crystals is to provide an intense pulsed beam of either the fundamental, the second-harmonic, or the third-harmonic of the 1.053 micrometer wave to the focus lens drive assembly 30. This assembly then focuses the intense wave down to a very small aperture for irradiation of a laser fusion target within a laser fusion target chamber 32. A plurality of such pulsed beams simultaneously irradiates a target to initiate nuclear fusion of the target material for purposes of energy production or development of fusion processes.

FIG. 3(a) schematically shows the Nova laser system which provides a large aperture, pulsed beam of laser radiation at 1.053 micrometers wavelength represented by the rays 26 to the integral frequency-multiplier assembly 10. For fundamental wavelength operation, the assembly is detuned by being rotated and tilted away from the optimum alignment angles so that the fundamental wavelength passes through essentially unchanged except for polarization. The lenses 36,37 of the focus lens driver assembly 30 are adjusted to focus the fundamental wavelength beam onto the fusion target. By aligning the birefringent crystal assembly 10 in certain orientations with respect to the input wave, elliptically polarized light can be obtained from the linearly polarized light.

For operation at the second-harmonic wavelength, FIG. 3(b) shows the same arrangement of elements as FIG. 3(a) with the addition of a fundamental-wavelength beam dump 38, which absorbs residual fundamental wavelength. In this configuration, the integral frequency-multiplier assembly 10 is rotated and tilted to the proper angles and the lenses 36,37 of the focus lens driver assembly 30 are adjusted for second-harmonic operation.

For operation at the third-harmonic wavelength, FIG. 3(c) shows the arrangement of elements as in FIGS. 3(a) and 3(b) with the exception that a beam dump 40 is used to absorb residual fundamental and second-harmonic wavelengths. The integral frequency-multiplier assembly 10 is rotated and tilted to the proper angles and the lenses 36, 37 of the focus lens driver assembly 30 are adjusted for third-harmonic operation.

It should be apparent that conversion from one mode of operation to another is a relatively simple operation which involves simple alignment steps. For Type II KDP crystals and a linearly polarized fundamental wavelength of 1.053 micrometers, to convert from second to third-harmonic operation involves a rotation of about ten degrees and a tilt of about 4.4 milliradians.

FIG. 4(a) shows an integral assembly 10 which has a 74 cm aperture and which uses KDP crystals 50 having a thickness, or crystal length, of 1.3 to 1.5 cm. The crystals 50 are sandwiched between thicker supporting windows 52 of transparent glass having antireflection coatings. As shown in FIG. 4(b), thin layers of index-matching fluid, less than 100 micrometers thick (not to scale), are positioned between the crystal and window surfaces to reduce Fresnel losses. The KDP crystals are precision machined using diamond turning technology and precision measurement techniques for the phase-matching angles so that the phase-matching direction and surface normal are accurately aligned in the individual crystals incorporated into the integral assembly 10.

Figure 5:
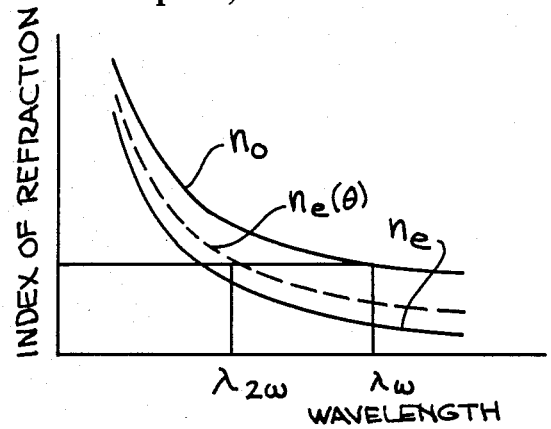
FIG. 5(a) is a graph of the index of refraction for a typical negative uniaxial birefringent crystal as a function of frequency.
FIG. 5(b) is a schematic representation of the index of refraction ellipsoid for KDP showing phase-matching for Type I and Type II crystals.
FIG. 5(c) is a schematic representation of a KDP crystal element aligned to produce second-harmonic output waves.
Figure 5:
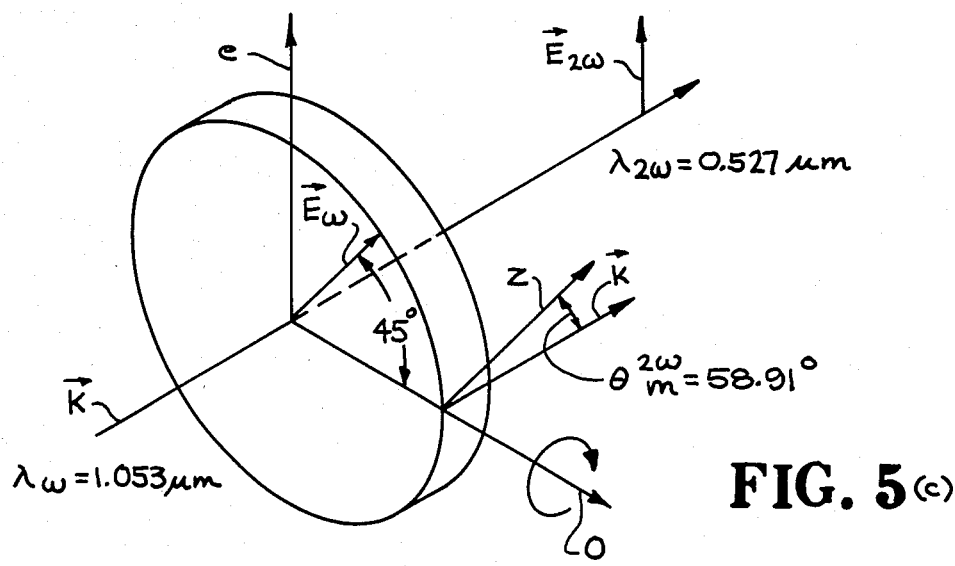
Figure 5:
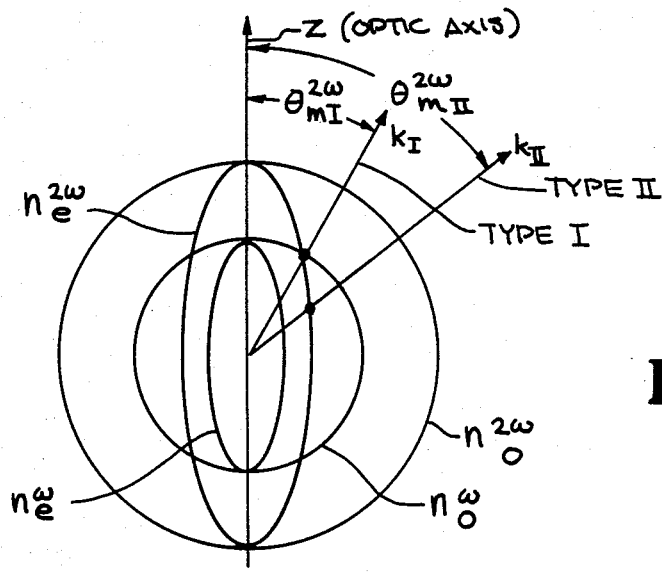

The first material to exhibit phase-matched second harmonic generation was KDP ($KH_2PO_4$). Although the number of candidate materials has climbed into the hundreds, KDP remains the best choice for the frequency conversion of the large aperture laser system. The refractive index dispersion curves for a negative uniaxial crystal, like KDP, are shown in FIG. 5(a). Light polarized perpendicular to the crystal optics axis propagates with a phase velocity determined by the "ordinary" index of refraction $n_o$. The orthogonal component propagates with a phase velocity determined by the "extraordinary" index of refraction $n_e(\theta)$, which depends on the angle between the crystal optic axis and the direction of propagation. This angle can be adjusted by tilting the crystal about its ordinary axis (90° to the optic axis) until the phase-matching condition is achieved. Two types of phase-matching are possible:

$$n_{2\omega}^e = n_\omega^o \qquad \text{TYPE I SHG}$$

$$n_{2\omega}^e = \frac{n_\omega^o + n_\omega^e}{2} \qquad \text{TYPE II SHG}$$

$$3n_{3\omega}^e = 2n_\omega^o + n_\omega^e \qquad \text{TYPE II THG}$$

For clarity, Type I angle tuned phase-matching is illustrated in FIG. 5(a), but Type II is chosen in the preferred embodiment described herein.

FIG. 5(b) is the index ellipsoid for KDP. Phase-matching for an ordinary fundamental wave and an extraordinary second-harmonic wave are obtained at an angle $$\theta^{2\omega}_{mI}$$

(approximately 41°) where the index of refraction $n_o$ of the fundamental input ordinary wave equals the index of refraction $$n_e^{2\omega}.$$

For the case of Type II KDP, the phase-matching angle $$\theta^{2\omega}_{mII}$$

for second-harmonic generation (SHG) is approximately 58.91 degrees. Similarly, for the case of Type II KDP, the phase-matching angle $$\theta^{3\omega}_{mII}$$

for third-harmonic generation (THG) is approximately 59.09 degrees. It should be noted that the difference between these angles is rather small and can readily be obtained using the gimbal structure of FIG. 1. It should be noted that the phase-matching angles will be slightly different for different KDP crystals. The absolute values of the phase-matching angles are sensitive to temperature, wavelength, material purity, optical quality, mechanical strain, etc. An important point for KDP, in comparison to other materials, is that the phase-matching angles for second and third harmonic differs by a very small amount at a wavelength of 1.053 micrometers.

FIG. 5(c) is a schematic representation of second-harmonic generation using a Type II KDP crystal, shown having an ordinary axis "o" and an extraordinary axis "e". The optic axis is represented by z which is aligned at the second-harmonic phase-matching angle, 58.91 degrees, with respect to the propagation vector k of the fundamental input wave. Phasematching is achieved by rotating the crystal about the ordinary axis "o". The input wave has a wavelength of 1.053 micrometers and an electric-field polarization vector $E_\omega$ is aligned at forty-five degrees with respect to the ordinary direction. The second-harmonic output wave $E_{2\omega}$ at 0.527 micrometers is polarized in the extraordinary direction "e".

Figure 6:
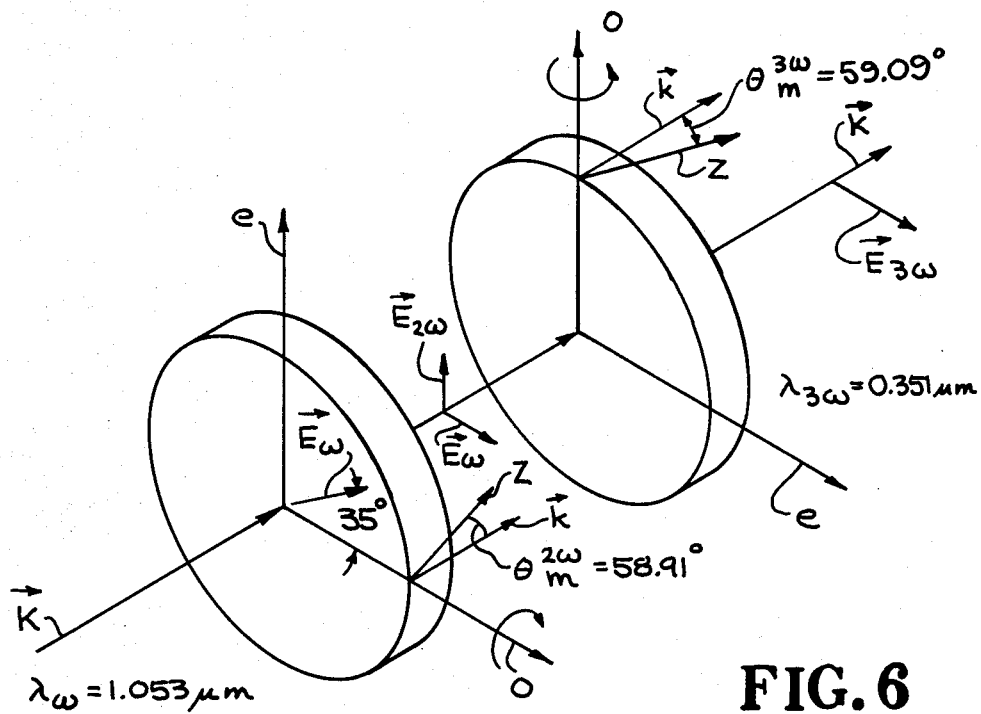
FIG. 6 is an isometric schematic view of a frequency-converter assembly using two spaced-apart converter crystal aligned to produce a third-harmonic output wave.

FIG. 6 is an exploded schematic view of two Type II KDP crystal elements arranged to generate a second-harmonic wave in the first crystal which is then mixed with residual fundamental in the second crystal to produce third-harmonic. This figure shows the scheme described hereinabove in the Prior Art section as reported by Seka et al. in Optics Communications, Vol. 34, No. 3, p. 469 (1980). The first crystal is aligned as in FIG. 5(b) with the exception that the electric-polarization vector is aligned at $\tan^{-1} 2/\sqrt{2}$, or approximately 35 degrees, to provide an ordinary-direction input component twice as great as the extraordinary-direction component. Approximately one-third of the input wave passes through the first crystal and mixes in the second crystal with second-harmonic generated in the first crystal to produce a third-harmonic output wave at 0.351 micrometers wavelength. The first crystal is aligned to the second-harmonic phase-matching angle of about 58.91 degrees while the second crystal is aligned to the third-harmonic phase-matching angle of about 59.09 degrees. Note that this arrangement requires that each crystal be tilted at a different phase-matching angle.

Figure 7:
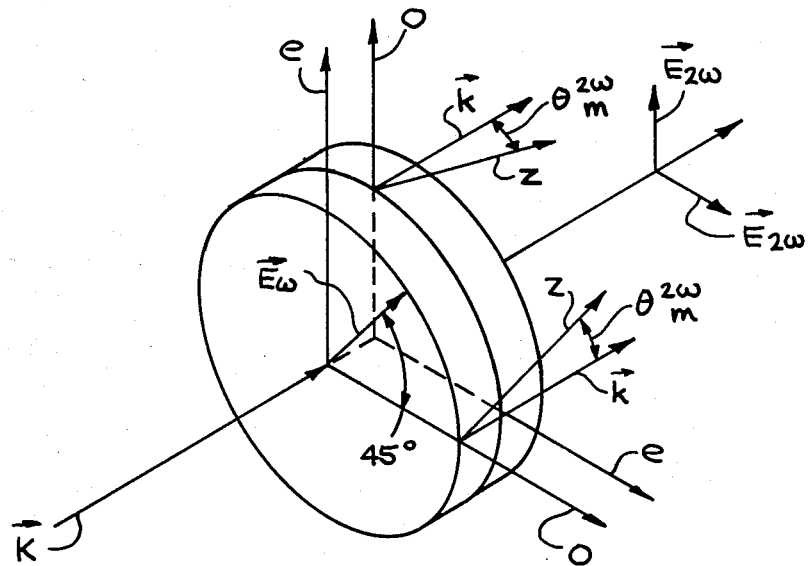
FIG. 7 is an isometric schematic view of the frequency-converter assembly according to the invention aligned to produce quadrature second-harmonic output waves.
Figure 8:
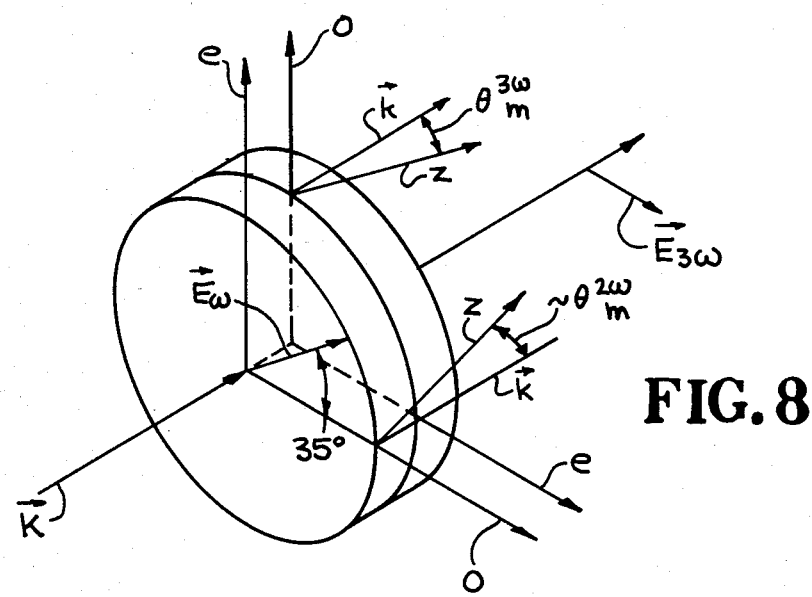
FIG. 8 is an isometric schematic view of the frequency-converter assembly according to the invention aligned to produce a a third-harmonic output wave.

FIGS. 7 and 8 show two birefringement unaxial Type II KDP crystal elements serially arranged and fixed together, for example by the arrangement shown in FIG. 4(a), into an integral assembly. As shown, the crystal elements are oriented so that the ordinary direction of the first unaxial crystal element is parallel with the extraordinary direction of the second crystal element. The extraordinary direction of the first crystal element is parallel to the ordinary direction of the second crystal element. It should be appreciated that the crystal elements for large aperture devices such as for the Nova fusion system can be formed as an array of smaller crystals as discussed hereinabove in connection with FIGS. 1 and 4(a).

The rotatable ring 24 of FIG. 1 serves, for example, as a means for aligning the electric-field polarization vector of the input wave with respect to the first crystal at a forty-five degree angle such that the ordinary direction components and the extraordinary-direction components of the input wave can be made substantially equal in each crystal element. Additionally, alignment can be obtained by this means such that the ordinary-direction component in the first uniaxial crystal element with respect to the extraordinary-direction component is in the ratio of two-to-one for third-harmonic generation.

Figure 9:
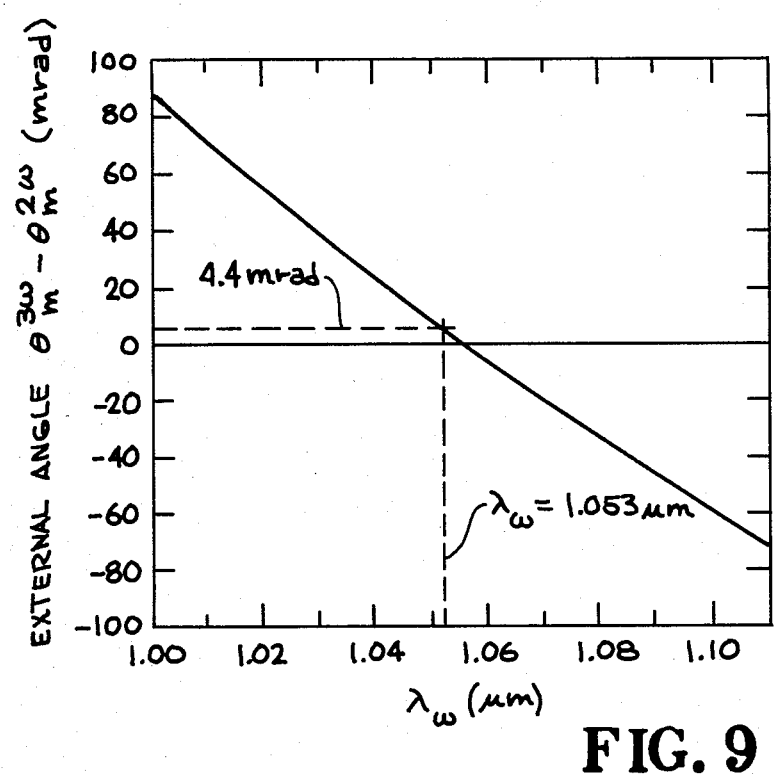
FIG. 9 is a graph showing the difference between the phase-matching angles for second and third-harmonic generation for Type II KDP crystals as a function of fundamental input wavelength.

FIG. 9 shows the difference between the phase-matching angles for second and third-harmonic generation for Type II KDP crystals as a function of wavelength. In practice, the absolute values of the phase-matching angles may vary slightly with temperature, etc., conditions so that it is the differences in the angles that is significant when going from one wavelength to another. For 1.053 micrometers, the difference is 4.4 milliradians. The gimbal structure 16 of FIG. 1 serves, for example, as a means for aligning the propagation vector k of the input wave at a phase-matching angle with respect to the optic axes of the first and second crystal elements. For second-harmonic generation in Type II KDP crystals this is an angle of about 58.91 degrees. For third-harmonic generation, the second crystal element is adjusted to the third-harmonic phase-matching angle of about 59.09 degrees for mixing in the second crystal. This result in the first crystal being slightly misaligned for second-harmonic generation, but the crystal is relatively insensitive to rotation about the "e" direction.

Figure 10:
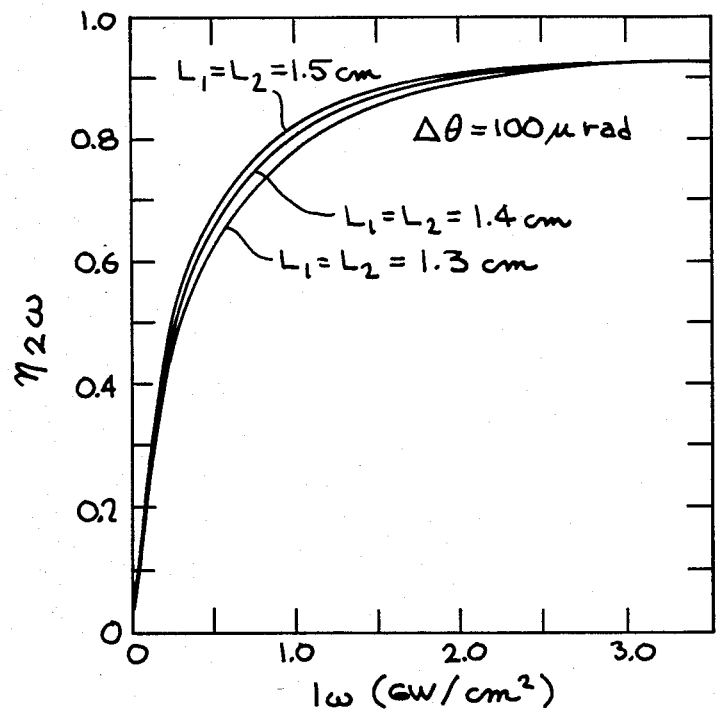
FIG. 10 is a graph of quadrature second-harmonic conversion efficiency as a function of input intensity for an integral assembly of crystal elements according to the invention.
Figure 11:
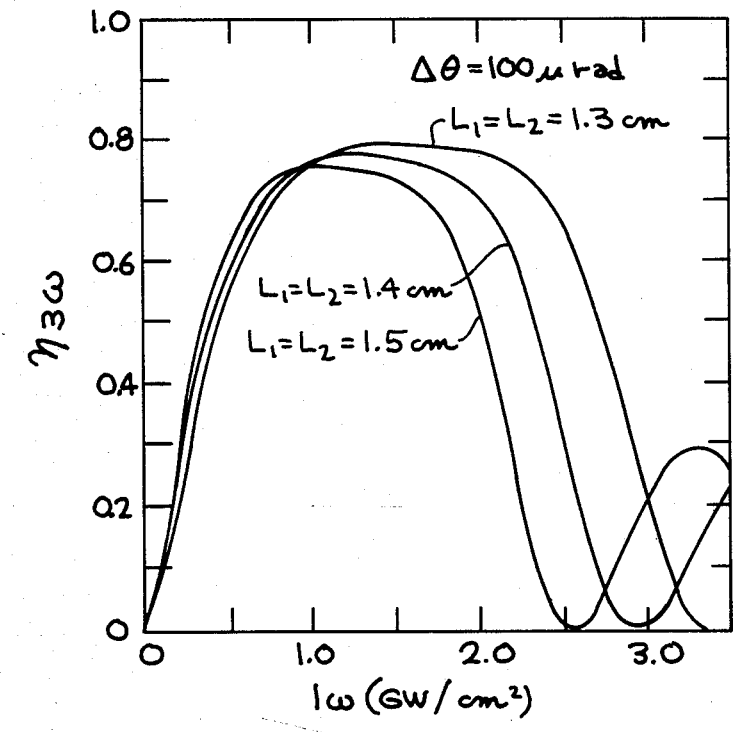
FIG. 11 is a graph of third-harmonic conversion efficiency as a function of input intensity for an integral assembly of crystal elements according to the invention.

As shown in FIG. 10, using an integral assembly of the first and second Type II KDP crystals, each having a thickness L of between 1.3 to 1.5 cm and mounted as in the arrangements of FIGS. 1 and 4(a), a fundamental input intensity of between 1 to 5 GW/cm² produces efficiencies in the range of eighty percent. FIG. 10 shows efficienceies for third-harmonic generation of better than 70 percent over a fundamental input intensity range of 1 to 2 GW/cm².

Figure 12:
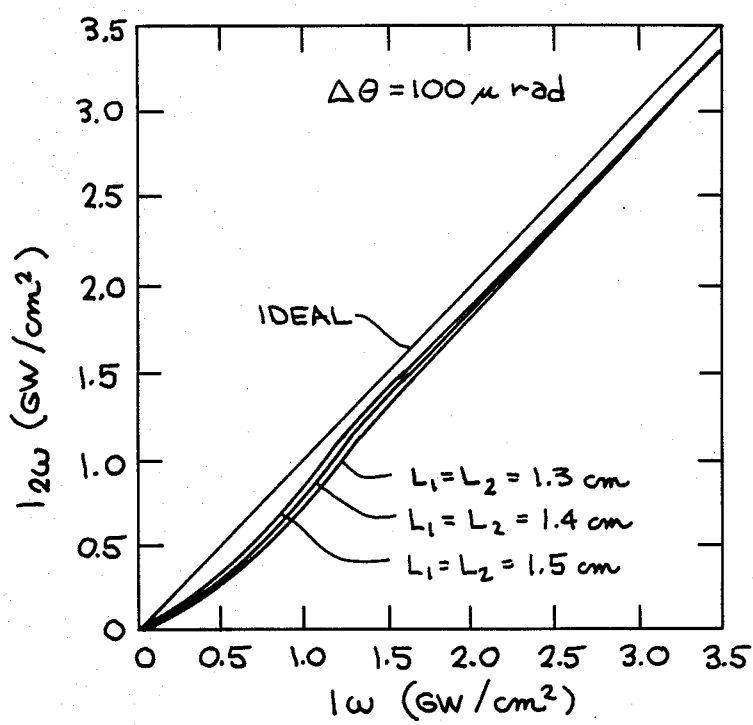
FIG. 12 is a graph of of quadrature second-harmonic output intensity as a function of input intensity with crystal length as parameters.
Figure 13:
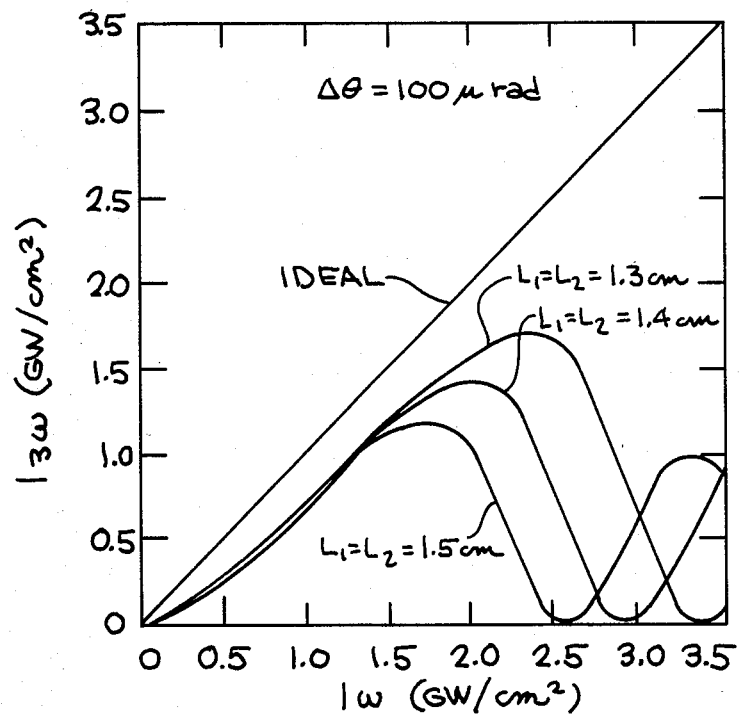
FIG. 13 is a graph of of third-harmonic output intensity as a function of input intensity with crystal lengths as parameters.

FIGS. 12 and 13, respectively, plot second and third-harmonic output intensity as a function of fundamental input intensity for various crystal thicknesses.

The means for aligning the propagation vector k of the input wave at the phase-matching angles, that is, the gimbal arrangement 16 of FIG. 1 can be adjusted to control the amount of second-harmonic phase-matching for each crystal element. For a given input wave intensity this controls the amount of second-harmonic generated in each crystal element. Each second-harmonic quadrature output component can, thus, be varied to produce an output wave having a desired eliptical polarization.

When the gimbal arrangement 16 is not aligned, as described in relation to FIG. 3(a), for harmonic-generation phase-matching, the fundamental wave passes through the assembly 10 of birefringent crystals shown in FIG. 1. By rotating the assembly 10, that is by aligning the fundamental input polarization with respect to the birefringent crystals in certain orientations, the polarization of the output fundamental wave can be selected to obtain various degrees of elliptically polarized light.

The invention thus provides a second and third-harmonic frequency-conversion using uniaxial crystal elements which are fixed together in an integral assembly. To change from one mode of operation to another, the assembly, which in one embodiment is mounted on a rotatable gimbal arrangement, is merely rotated ten degrees and tilted a few milliradians. It should, therefore, be appreciated that considerable time and money will be saved by use of this invention. For installations which use a large number of these frequency-converters, their simplicity of operation, interchangeability of components, and high efficiency are significant advantages.

The foregoing description of preferred embodiments of the invention have been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

We claim:

1. An optical frequency generator in the path of a fundamental frequency input wave, said generator selectively passing a fundamental frequency output wave, generating a second-harmonic frequency output wave or generating a third-harmonic frequency output wave in response to the fundamental frequency input wave, the input wave having a propagation vector k and an electric-field polarization vector, comprising:

first and second serially arranged birefringent uniaxial crystal elements, each having an optic axis, ordinary and extraordinary directions;

means for fixedly positioning said uniaxial crystal elements into an integral assembly with the crystal elements oriented so that the ordinary polarization direction of the first uniaxial crystal element is parallel with the extraordinary polarization direction of the second uniaxial crystal element and so that the extraordinary direction of the first uniaxial crystal element is parallel to the ordinary direction of the second uniaxial crystal element, said fixedly positioning means providing for said elements to move together as a single unit and to be mounted closely adjacent together;

means for aligning the electric-field polarization vector of the input wave with respect to the first of the serially-arranged uniaxial crystal elements such that the ordinary-direction component and the extraordinary-direction component of the input wave are substantially equal in each uniaxial crystal;

means for aligning the propagation vector k of the input wave at a phase-matching angle with respect to the optic axis of the first uniaxial crystal element and with respect to the optic axis of the second uniaxial crystal elements such that quadrature second-harmonic output waves are produced by the first and second uniaxial crystal elements when a fundamental input wave of sufficient intensity irradiates the integral assembly;

wherein the means for aligning the electric-field polarization vector of the input wave with respect to the first unaxial crystal element is adjustable such that the ordinary-direction component and the extraordinary-direction component in the first uniaxial crystal element are provided in the ratio of two-to-one so that the first uniaxial crystal element produces second-harmonic frequency waves having an electric-field polarization vector parallel to the ordinary direction of the second uniaxial crystal element;

wherein the means for aligning the propagation vector k of the input wave at a phase-matching angle with respect to the optic axis of the second uniaxial crystal element is adjustable such that the second-harmonic wave and the residual fundamental wave from the first uniaxial crystal element mix in the second uniaxial crystal element to generate a third harmonic wave when a fundamental input wave of sufficient intensity is provided;

wherein the means for aligning the propagation vector k of the input wave at a phase-matching angle with respect to the optic axis of the first and second uniaxial crystal elements is variably adjustable for controlling the amount of phase-matching for each crystal element to selectively control the amount of second-harmonic generated in each crystal for providing an elliptically-polarized second-harmonic output wave; and wherein the means for aligning the propagation vector k of the input wave is adjustable to pass the fundamental wave through the crystal elements and wherein the means for aligning the electric-field polarization vector of the fundamental wave is adjustable to obtain a selected degree of elliptical polarization state after passage through the birefringent uniaxial crystal elements.

2. The generator of claim 1 wherein the first and second uniaxial crystal elements are Type II KDP;

wherein, the second-harmonic generation of waves at 0.527 micrometers, the input wave at 1.053 micrometers is linearly polarized with its electric-field polarization vector aligned at an angle of 45° with respect to the ordinary direction of the first and the second uniaxial crystal elements; and wherein the phase-matching angle is approximately 58.91 degrees.

3. The generator of claim 1 wherein for third-harmonic generation of waves at 0.351 micrometers, the input wave at 1.053 micrometer is linearly polarized with its electric-field polarization vector aligned at an angle of $\tan^{-1} 1/\sqrt{2}$ with respect to the ordinary direction of the first uniaxial crystal element; and wherein the phase-matching angle for the second uniaxial crystal element is approximately 59.09 degrees.

4. The generator of claim 1 wherein the unaxial crystal elements are arrays of smaller crystal elements sandwiched between two windows.

5. The generator of claim 6 wherein the windows are coated with antireflection material and including thin layers of index-matching fluid positioned between the surfaces of the crystal elements and the windows.

6. The generator of claim 1 wherein the means for aligning the electric-field polarization vector of the input wave includes means for rotating the integral assembly of the unaxial crystal elements.

7. The generator of claim 1 wherein the means for aligning the propagation vector k of the input wave includes means for tilting the integral assembly of the crystal elements about axes in two orthogonal directions.

8. The generator of claim 7 wherein tilting means includes a gimbal on which is mounted the integral crystal assembly.

9. An integral quadrature second-harmonic and cascade third-harmonic optical frequency generator apparatus for selectively passing a fundamental frequency input wave, doubling the frequency of the input wave, or tripling the frequency of the input wave, the input wave having a propagation vector k and a linearly polarized electric-field vector, which apparatus comprises:

a pair of substantially identical crystal elements, each having substantially the same crystal length and each having its respective ordinary and extraordinary propagation directions positioned in a plane normal to the direction of the propagation vector k of the input signal;

means for fixing the pair of crystal elements in series to form an integral assembly of the crystal elements with the respective extraordinary axes of each of the pair of crystal elements orthogonal, said fixing means providing for said elements to move together as a single unit and to be mounted closely adjacent together;

means for rotating the integral assembly of the crystal elements around the propagation vector k of the input wave (a) so that, for second harmonic generation, the electric-field polarization vector of the input wave is aligned at a forty-five degree angle with respect to the ordinary axis of each of the pair of crystal elements to produce quadrature second-harmonic output waves, and (b) so that, for third harmonic generation, the electric-field polarization vector of the input light signal is aligned at a $\tan^{-1} 1/\sqrt{2}$ angle with respect to the ordinary axis of the first of the pair of crystal elements so that the component of the input wave in the direction of the ordinary direction of the first of the pair of crystal elements produces a second-harmonic wave in the first of the pair of crystal elements, which is then mixed with the remainder of the input wave in the second crystal element;

means for rotating the integral assembly of the crystal elements about the ordinary axes of each of the pair of crystal elements to phase-match the crystal assembly for second harmonic generation; and means for rotating the integral assembly of the crystal elements about the ordinary axis of the second crystal to phase-match the crystal assembly for third harmonic generation.

10. The apparatus of claim 9
wherein the input light wave has a wavelength of 1.053 micrometers,
wherein, for second-harmonic generation of waves at 0.527 micrometers, the input wave at 1.053 micrometers is linearly polarized with its electric-field polarization vector aligned at an angle of 45° with respect to the ordinary direction of the first and the second uniaxial crystal elements, and the phase-matching angle is approximately 58.91 degrees; and
wherein, for third-harmonic generation of waves at 0.351 micrometer, the input wave at 1.053 micrometer is linearly polarized with its electric-field polarization vector aligned at an angle of $\tan^{-1} 1/\sqrt{2}$ with respect to the ordinary direction of the first uniaxial crystal element; and wherein the phase-matching angle for the second uniaxial crystal element is approximately 59.09 degrees.

11. The apparatus of claim 9 wherein each crystal element is formed as an array of smaller crystal elements.

12. A method of generating second and third harmonic frequencies from an input wave having a given electric-field polarization vector, comprising the steps of:
fixing two crystal elements together in series to form an integral assembly such that their extraordinary axes are perpendicular to each other;
rotating the integral assembly to have the polarization vector of the input optical signal at
(1) a 45° degree angle with respect to the ordinary axis of the first of the crystal elements for second harmonic generation, and
(2) a $\tan^{-1} 1/\sqrt{2}$ degree angle with respect to the ordinary axis of the first of the crystal elements for third harmonic generation which is accomplished by frequency doubling a portion of the input wave in the first crystal element and by mixing the doubled wave with the remaining portion of the input wave in the second crystal element;
tilting the crystal assembly to an angle to phase-match the crystal elements for second harmonic generation and to an angle to phase-match the second crystal element for third harmonic generation.

13. The optical frequency generator of claim 1, wherein said crystal elements are fixedly positioned together closely adjacent and separated only by a thin layer of index-matching fluid less than 100 micrometers thick.

14. The optical frequency generator apparatus of claim 9, wherein said crystal elements are Type II KDP crystal elements.

* * * * *